US011688427B1

(12) United States Patent
Jin et al.

(10) Patent No.: US 11,688,427 B1
(45) Date of Patent: Jun. 27, 2023

(54) ANGLED FREE LAYER FOR MULTI-LEVEL READ SIGNALS

(71) Applicant: Western Digital Technologies, Inc., San Jose, CA (US)

(72) Inventors: Zhen Jin, Fremont, CA (US); Xiaodong Che, Los Gatos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/680,043

(22) Filed: Feb. 24, 2022

(51) Int. Cl.
| | |
|---|---|
| *G11B 5/39* | (2006.01) |
| *G11B 11/10* | (2006.01) |
| *G11B 21/10* | (2006.01) |
| *G11B 5/012* | (2006.01) |

(52) U.S. Cl.
CPC ............ *G11B 21/106* (2013.01); *G11B 5/012* (2013.01)

(58) Field of Classification Search
CPC ... G11B 5/3912; G11B 5/3906; G11B 5/3909; G11B 5/3932; G11B 5/3948; G11B 5/3954; G11B 5/4886; G11B 5/43964; G11B 2005/3996; G11B 11/10; G11B 5/39; G11B 5/3903
USPC ...................... 360/59, 324.1, 324.11, 324.12
See application file for complete search history.

(56) References Cited

U.S. PATENT DOCUMENTS

| | | | |
|---|---|---|---|
| 5,541,793 A | 7/1996 | Schwarz | |
| 9,275,675 B2 | 3/2016 | Erden et al. | |
| 9,396,745 B2 | 7/2016 | Macken et al. | |
| 9,449,621 B1 | 9/2016 | Mauri et al. | |
| 9,741,369 B2 | 8/2017 | Batra et al. | |
| 10,332,557 B1 | 6/2019 | Mendonsa et al. | |
| 10,332,547 B1 | 10/2019 | Erden et al. | |
| 10,490,219 B1 | 11/2019 | Erden et al. | |
| 10,777,222 B1 * | 9/2020 | Liu ...................... | G11B 5/3954 |
| 2004/0061978 A1 | 4/2004 | Kawato | |
| 2013/0286502 A1 | 10/2013 | Erden et al. | |
| 2014/0118860 A1 | 5/2014 | Poorman | |

OTHER PUBLICATIONS

Hwang et al., "Skew-Dependent Performance Evaluation of Array-Reader-Based Magnetic Recording With Dual-Reader," IEEE Transactions on Magnetics, vol. 51, No. 4, Apr. 2015, 7 pgs.
Lippman et al., "Spinstand demonstration of areal density enhancement using two-dimensional magnetic recording (invited)," Journal of Applied Physics, 117, 172613 (2015), 6 pgs.

* cited by examiner

*Primary Examiner* — Nabil Z Hindi
(74) *Attorney, Agent, or Firm* — Patent Law Works LLP

(57) ABSTRACT

Example read transducers, data storage devices, and methods to provide an angled free layer for generating and decoding multi-level read signals are described. The read transducer includes a free layer having a magnetization bias sensitive to an external magnetic field and the direction of the magnetization bias forms an acute angle relative to a surface of the non-volatile storage medium generating the external magnetic field. The read transducer also includes a pinned layer having a fixed magnetization and a direction of the fixed magnetization forms a right angle with the magnetization bias of the free layer. The read transducer targets a readback location on a track boundary between adjacent tracks and generates a read signal indicative of perpendicular and cross-track fields of the adjacent tracks.

23 Claims, 8 Drawing Sheets

ANGLED FREE LAYER FOR MULTI-LEVEL READ SIGNALS

TECHNICAL FIELD

The present disclosure relates to read heads and related signal decoding for data storage devices. In particular, the present disclosure relates to a read head configuration for producing multi-level read signals.

BACKGROUND

Data storage devices such as hard disk drives comprise a magnetic disk and a head connected to a distal end of an actuator arm which is rotated about a pivot by a voice coil motor (VCM) to position the head radially over the disk. The head comprises one or more reader elements for generating signals from the disk and writer elements for writing signals to the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track. The magnetic disk acts as a non-volatile storage medium for storing data. In perpendicular recording, positive data bits may be magnetized out (perpendicular) to the plane of the disk and negative data bits may be magnetized into (perpendicular in opposite direction) the plane of the disk.

FIG. 1 shows a prior art disk format 2 as comprising a number of servo tracks 4 defined by servo sectors $6_0$-$6_N$ recorded around the circumference of each servo track. In some configurations, each servo sector comprises a preamble for storing a periodic pattern, which allows proper gain adjustment and timing synchronization of the read signal, and a sync mark for storing a special pattern used to symbol synchronize to a servo data field. The servo data field stores coarse head positioning information, such as a servo track address, used to position the head over a target data track during a seek operation. Each servo sector $6_i$ further comprises groups of servo bursts (e.g., N and Q servo bursts), which are recorded with a predetermined phase relative to one another and relative to the servo track centerlines. The phase-based servo bursts provide fine head position information used for centerline tracking while accessing a data track during write/read operations. Concentric and/or spiral data tracks may be interleaved with the servo tracks to provide non-volatile storage of data bits.

FIG. 2 shows a prior art mechanical configuration for a hard disk drive (HDD) 200 comprising a spindle 202 that holds a plurality of platters 204. Each platter 204 has at least one magnetic surface 206, such as a magnetic surface formatted similarly to disk format 2 in FIG. 1. Magnetic surface 206 may be configured to have digitally encoded data stored thereon as magnetized domains. A head 208 may be mounted at the end of an arm 210 controlled by an actuator 212 to move over magnetic surface 206 on an air bearing surface of the head that is substantially parallel to magnetic surface 206. A reader element 214, such as a read transducer, may be configured to detect magnetized portions of magnetic surface 206 and generate an analog read signal. A writer element 216 may be configured to generate a timed write field to write (or erase) magnetized portions of magnetic surface 206 using an analog write signal. In some configurations, head 208 may include more than one reader element 214 and/or writer element 216 and HDD 200 may include multiple heads 208, arms 210, and/or actuators 212.

A preamplifier (preamp or preamplifier circuit) 218 controls the read and write signals to the corresponding read and write elements (e.g., read element 214 and write element 216) of each head (e.g., head 208). For example, preamplifier 218 may include a plurality of write driver circuits and read driver circuits corresponding to each head and their respective read elements and write elements. Preamplifier 218 may be attached to a flex circuit 220 that provides a data and power bus connection to a printed circuit board (not shown) with other drive control circuitry, such as a disk drive controller, through a flex interface connector 222.

In some reader element configurations, one or more read transducers include a free layer parallel to the disk surface that will be impacted by the perpendicular magnetic domains and corresponding magnetic flux from bits stored to the magnetic medium. Reader elements sense the perpendicular magnetic field and, depending on the polarity (out-of-plane or into plane), generate positive and negative signal waveforms representing the stored bit data. The readback waveform is converted to a digital bit stream in the read channel of the data storage device.

Reader elements may also be influenced by cross-track magnetic fields generated by adjacent (in the radial direction of the disk) magnetic domains. This may generate noise in the readback waveform. In order to increase areal densities and improve readback performance, it may be beneficial to use cross-track signals and enable readback configurations capable of reading multiple signals (from adjacent tracks) simultaneously.

There is a need for technology that enables more effective and efficient reading of multiple tracks at the same time.

SUMMARY

Various aspects for a read transducer with an angled free layer for generating multi-level read signals are described, particularly for use in a read head for data storage devices that follow a track boundary as the readback path.

One general aspect includes a data storage device that includes a storage medium and a read transducer that includes: a free layer configured to have a magnetization bias sensitive to an external magnetic field, where a direction of the magnetization bias forms an acute angle relative to a surface of a storage medium generating the external magnetic field; and a pinned layer configured to have a fixed magnetization, where a direction of the fixed magnetization forms a substantially right angle with the magnetization bias of the free layer. The data storage device also includes a controller configured to cause the read transducer to: target a readback location on a track boundary between adjacent tracks on the surface of the storage medium; and generate a read signal indicative of perpendicular fields of the adjacent tracks and cross-track fields of the adjacent tracks.

Implementations may include one or more of the following features. The adjacent tracks may include a first data track and a second data track and the read signal may include a signal amplitude that is a superposition of a response of the free layer to the perpendicular field of the first data track, the perpendicular field of the second data track, the cross-track field of the first data track, and the cross-track field of the second data track. The read signal may corresponds to a first magnetic domain in the first data track and a second magnetic domain in the second data track; the first magnetic domain may indicate a first bit state; the second magnetic domain may indicate a second bit state; the first magnetic domain and the second magnetic domain may be synchronized in a down-track direction; and the signal amplitude may indicate a combination of the first bit state and the second bit state. The acute angle of the magnetization bias of the free layer may be configured to increase, relative to a magnetization bias parallel to the surface of the storage medium, free layer sensitivity to cross-track fields from the adjacent tracks. The data storage device may include a read channel circuit configured to: receive the read signal from the read transducer; and determine data bits for the adjacent tracks from the read signal. The read channel circuit may be further configured to: determine a plurality of amplitude values corresponding to adjacent data bit states for the adjacent tracks; and convert the read signal into a digital stream of amplitude values. Determining data bits for the adjacent tracks may be based on comparing amplitude values from the digital stream to the plurality of amplitude values corresponding to the adjacent data bit states for the adjacent tracks. The controller may be further configured to cause the read transducer to: read a first track of the adjacent tracks on a first track boundary on a first pass; and read the first track on a second track boundary on a second pass. The read channel circuit may be further configured to determine the data bits for the first track using the read signals from the first pass and the second pass. The storage medium may include a series of adjacent tracks; the series of adjacent tracks may include synchronized pairs of adjacent tracks with magnetic domains aligned in a down-track direction; and the controller may be further configured to cause the read transducer to read the synchronized pairs of adjacent tracks in a single pass on every other track boundary. The storage medium may include a targeted track between a first adjacent track and a second adjacent track, and the controller may be further configured to cause the read transducer to: target a first readback location on a first track boundary between the targeted track and the first adjacent track on a first pass; and target a second readback location on a second track boundary between the targeted track and the second adjacent track on a second pass. The storage medium may include a plurality of adjacent tracks corresponding to a data block; a first track of the plurality of adjacent tracks may have a greater track width than a track width of other tracks of the plurality of adjacent tracks; the controller may be further configured to cause the read transducer to target a readback location within the greater track width of the first track and target readback locations on track boundaries between each adjacent track of the plurality of adjacent tracks; and a read channel may process read signals for the plurality of adjacent tracks in a single decoding operation. The storage medium may include a plurality of adjacent target tracks; the plurality of adjacent target tracks may include greater than two synchronized adjacent tracks with magnetic domains aligned in a down-track direction; the read transducer may have a transducer width greater than a track width of at least one track of the plurality of adjacent target tracks; the readback location may target a plurality of track boundaries in a single readback pass; and the read signal may be indicative of perpendicular fields of the plurality of adjacent target tracks and cross-track fields of the plurality of adjacent target tracks.

Another general aspect includes targeting, with a read transducer, a readback location on a track boundary between adjacent tracks on a surface of a storage medium of a data storage device, where the read transducer may include: a free layer having a magnetization bias sensitive to an external magnetic field, where a direction of the magnetization bias forms an acute angle relative to the surface of the storage medium generating the external magnetic field; and a pinned layer having a fixed magnetization, where a direction of the fixed magnetization forms a substantially right angle with the magnetization bias of the free layer. The method also includes generating, by the read transducer, a read signal indicative of perpendicular fields of the adjacent tracks and cross-track fields of the adjacent tracks.

Implementations may include one or more of the following features. The adjacent tracks may include a first data track and a second data track and the read signal may include a signal amplitude that is a superposition of a response of the free layer to: the perpendicular field of the first data track; the perpendicular field of the second data track; the cross-track field of the first data track; and the cross-track field of the second data track. The read signal may correspond to a first magnetic domain in the first data track and a second magnetic domain in the second data track; the first magnetic domain may indicate a first bit state; the second magnetic domain may indicate a second bit state; the first magnetic domain and the second magnetic domain may be synchronized in a down-track direction; and the signal amplitude may indicate a combination of the first bit state and the second bit state. The method may include: determining a desired perpendicular field response for the read transducer; determining a desired cross-track field response for the read transducer; and tuning the acute angle of the magnetization bias of the free layer to meet the desired perpendicular field response and the desired cross-track field response, where the acute angle of the magnetization bias of the free layer is configured to increase, relative to a magnetization bias parallel to the surface of the storage medium, free layer sensitivity to cross-track fields from the adjacent tracks. The method may include: determining a plurality of amplitude values corresponding to adjacent data bit states for the adjacent tracks; and receiving, by a read channel, the read signal from the read transducer; and converting, by the read channel, the read signal into a digital stream of amplitude values; comparing, by the read channel, amplitude values from the digital stream to the plurality of amplitude values corresponding to the adjacent data bit states for the adjacent tracks; and determining, by the read channel, data bits for the adjacent tracks based on comparing the amplitude values from the digital stream to the plurality of amplitude values. The method may include: reading, with the read transducer, a first track of the adjacent tracks on a first track boundary on a first pass; and reading, with the read transducer, the first track on a second track boundary on a second pass; and determining data bits for the first track using the read signals from the first pass and the second pass. The method may include reading, with the read transducer, synchronized pairs of adjacent tracks in a single pass on every other track boundary of a series of adjacent tracks, where the storage medium includes the series of adjacent tracks and the synchronized pairs of adjacent tracks have magnetic domains aligned in a down-track direction. The method may include targeting, with the read transducer, a first readback location on a first track boundary between a targeted track and a first adjacent track on a first pass; and targeting, with the read transducer, a second readback location on a second track boundary between the targeted track and a second adjacent track on a second pass, where the targeted track is between the first adjacent track and the second adjacent track. The method may include: targeting, with the read transducer, a readback location within a greater track width of a first track of a plurality of adjacent tracks corresponding to a data block, wherein the greater track width is greater than a track width of other tracks of the plurality of adjacent tracks; targeting, with the read transducer, readback locations on track boundaries between each adjacent track of the plurality of adjacent tracks; and processing read signals for the plurality of adjacent tracks in a single decoding operation.

Still another general aspect includes a data storage device that includes a non-volatile storage medium and a read transducer that includes: a free layer having a magnetization bias sensitive to an external magnetic field, where a direction of the magnetization bias forms an acute angle relative to a surface of the non-volatile storage medium generating the external magnetic field; and a pinned layer having a fixed magnetization, where a direction of the fixed magnetization forms a substantially right angle with the magnetization bias of the free layer. The data storage device also includes: means for targeting, with the read transducer, a readback location on a track boundary between adjacent tracks on the surface of the non-volatile storage medium; means for generating, by the read transducer, a read signal indicative of perpendicular fields of the adjacent tracks and cross-track fields of the adjacent tracks; and means for determining data bits for the adjacent tracks based on the read signal.

Yet another general aspect includes a read transducer including: a free layer having a magnetization bias sensitive to an external magnetic field, where a direction of the magnetization bias forms an acute angle relative to a surface of the non-volatile storage medium generating the external magnetic field; and a pinned layer having a fixed magnetization, where a direction of the fixed magnetization forms a substantially right angle with the magnetization bias of the free layer.

The present disclosure describes various aspects of innovative technology capable of increasing areal density in data storage devices using magnetic storage media, such as hard disk drives and tape drives. The various embodiments include read transducers and control circuitry to overcome or at least reduce issues previously encountered in data storage devices and, accordingly, are more efficient, reliable, and/or cost-effective than other data storage devices. That is, the various embodiments disclosed herein include hardware and/or software with functionality to improve the read signals and processing of read signals for retrieving stored data with lower bit error rates relative to the size and position of the magnetic domains used to store those bits, such as by using a read transducer with an angled free layer with improved response to on-track and cross-track fields. Accordingly, the embodiments disclosed herein provide various improvements to data storage devices and computing systems incorporating such data storage devices.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Figure 1:
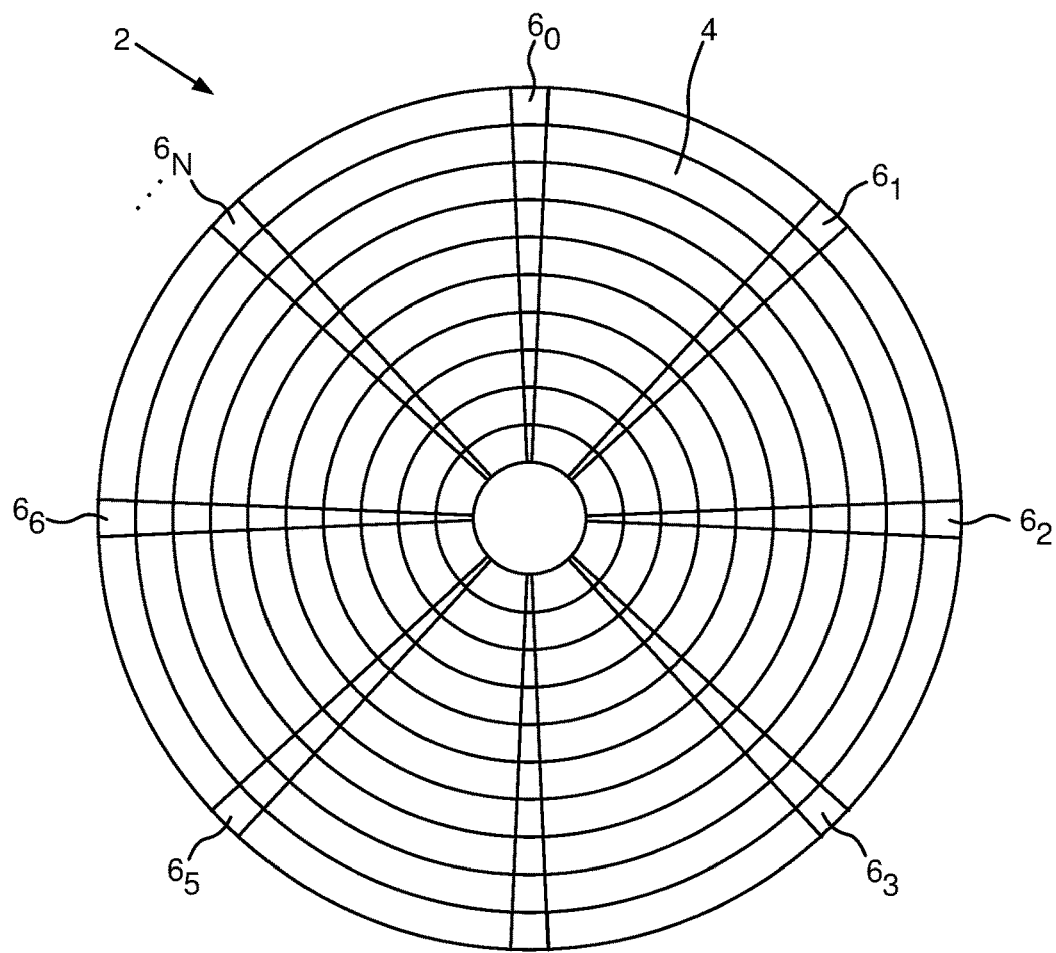
FIG. 1 is a diagram of a prior art disk format comprising a plurality of servo tracks defined by servo sectors.

Prior configurations of data storage devices, such as hard disk drives (HDDs) and tape drives, have used transducer heads to read back data stored on a magnetic storage medium that moves relative to the transducer head. Data on the storage medium may be organized in linear tracks of consecutive data bits with adjacent magnetic domains in the down-track direction. Each magnetic domain may include a surface area of the storage medium magnetized with a desired polarity representing binary bit states. For example, in perpendicular recording, the magnetic domains generate magnetic fields perpendicular to the surface of the storage medium, with positive (or 1) bits generating magnetic flux out of the plane (toward the read head) and negative (or 0) bits generating magnetic flux into the plane (away from the read head).

In some configurations, each transducer head may include two read transducer elements and share a head structure and air bearing surface with a write head element. The free layer of each read transducer is a generally planar structure (out-of-plane and cross-track) perpendicular to the surface of the storage medium. Prior configurations apply a read current to the free layer to induce a direction of magnetization in the free layer that is parallel to the surface of the storage medium in the cross-track direction. The read transducer passes over the center of the target track (or, at least somewhere within the track width of the target track, subject to the accuracy of the servo control) and each reader element senses the perpendicular (to the disk surface) magnetic field from the magnetic domains written to the data track. The sensed signal, depending on the polarity of the magnetic bits on the disk, generates positive and negative signal waveforms. This analog read signal is provided from the read head to a read channel, where the playback waveform is converted to a digital bit stream.

Prior configurations may rely on the playback wave form representing two bit states, a positive amplitude for one bit state and a negative amplitude for the other bit state (e.g., 1 and 0). For two-state signals and as described above, the free layer may be magnetized parallel to the surface of the storage medium and the polarity of the field from the storage medium may deflect the free layer to generate the variations in read signal. For example, when no external magnetic field (from the storage medium) is present, the free layer may maintain the baseline signal and a magnetization direction parallel to the surface of the storage medium. When a positive bit is under the read transducer, the free layer may be deflected away from the surface of the storage medium by the magnetic flux of the magnetized domain and generate a positive read signal. When a negative bit is under the read transducer, the free layer may be deflected toward the surface of the storage medium by the magnetic flux of the magnetized domain and generate a negative read signal. The read transducer also includes a pinned layer with a direction of magnetization perpendicular to the baseline magnetization of the free layer. The direction of magnetization of the pinned layer does not change based on the external field from the storage medium.

Figure 3:
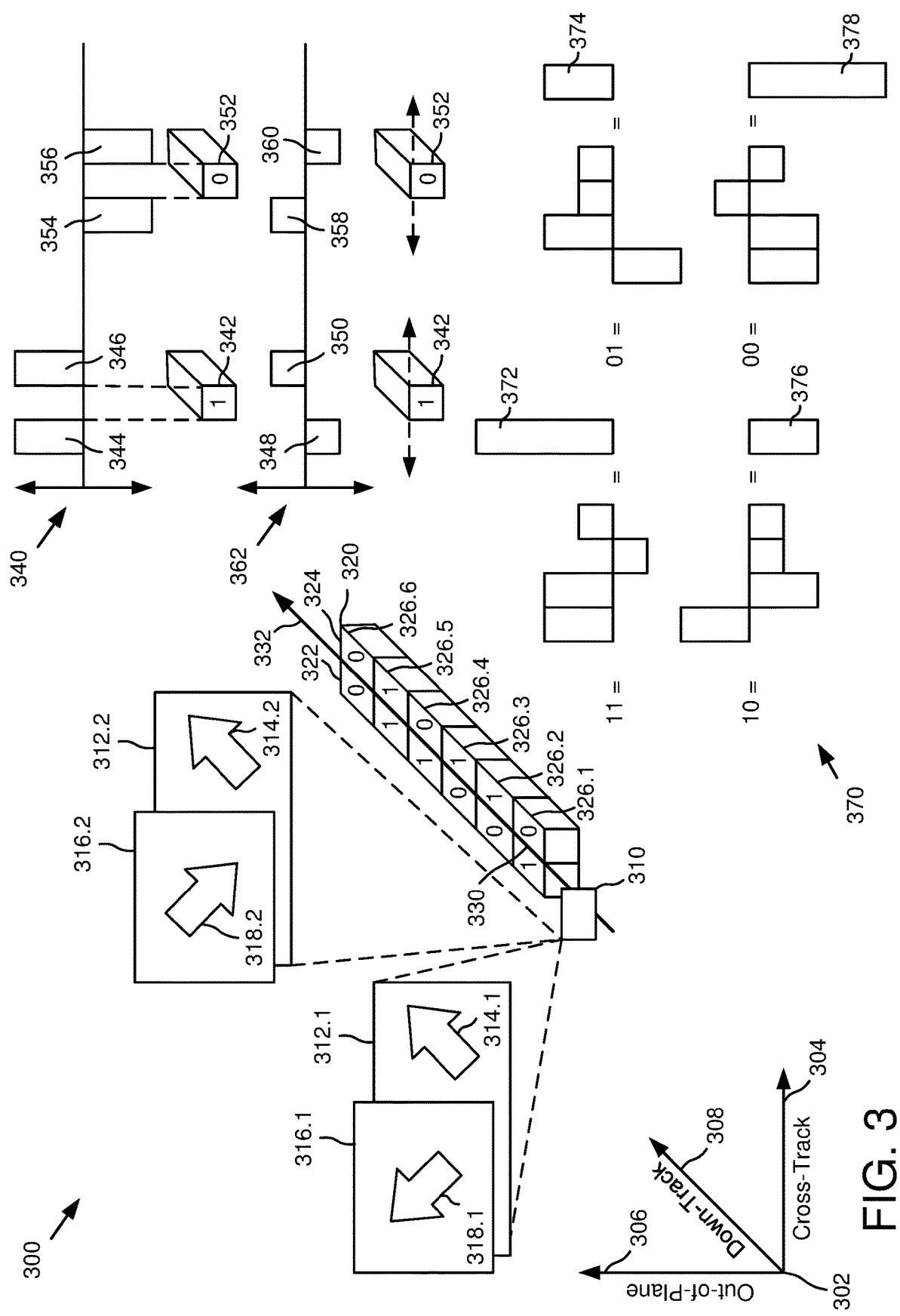
FIG. 3 is a diagram of an example read transducer configured to read multi-level signals from a readback path along a track boundary on a magnetic medium.

FIG. 3 shows a portion of example read transducer 300 for a data storage device, such as a hard disk drive (HDD). It is to be understood that the embodiments discussed herein are applicable to an HDD, as well as a tape drive such as a tape embedded drive (TED) or an insertable tape media drive, such as those conforming to the LTO (Linear Tape Open) standards. An example TED is described in U.S. Pat. No. 10,991,390, issued Apr. 27, 2021, titled "Tape Embedded Drive," and assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

A three-dimensional set of axes 302 indicates a cross-track direction 304, an out-of-plane direction 306, and a down-track direction 308. Axes 302 may assist in describing the relative positions and movement of various components in the head/media systems described herein. Storage medium 320 include a surface that provides a substantially planar surface proximate the read position of read transducer 310. For example, disk media defines a rotating read surface over which the head including read transducer 310 is positioned and the rotation of the disk moves the data bits past the read transducer along tracks (such as data tracks 322 and 324). In a tape drive, a portion of flexible, thin film magnetic tape may be driven past one or more stationary read heads including read transducer 310 and will exhibit a planar surface proximate the readback location. Cross-track direction 304 is the direction parallel to the width of the data tracks and may represent the radial direction on a disk or a line corresponding to the width and perpendicular to the length of a magnetic tape. The positive and negative directions of cross-track direction 304 may reference lateral positions across a track and/or lateral positions in adjacent tracks. Out-of-plane direction 306 is the direction perpendicular to the surface of storage medium 320. The positive and negative directions of out-of-plane direction 306 may reference distances above or below the surface of storage medium 320. For example, the read head is spaced some distance in the out-of-plane direction 306 by the air bearing surface of the head. Down-track direction 308 is the direction in which data is presented along a data track and may refer to the direction of travel of transducer 310 relative to storage medium 320 (even though it is often the medium and not the read head that is actually moving and the medium movement is in the opposite (negative) down-track direction). Down-track direction 308 may be treated as linear, even though concentric and spiral data tracks on rotating media are technically curved, their curvature is negligible at the relative scale of track widths, bit lengths, and reader dimensions (compared to the length and curvature of the track). Each of cross-track direction 304, out-of-plane direction 306, and down-track direction 308 are perpendicular to each other axis.

In the example shown, control circuitry 300 may include one or more read transducers 310. Read transducer 310 may be configured in one or more head structures configured to be maintained perpendicular to the surface of storage medium 320 by an air bearing surface parallel to the surface of storage medium 320. Read transducer 310 may include a pinned layer 312 having a direction of magnetization 314 and a free layer 316 have a different direction of magnetization. Free layer 316 may have a free layer magnetization direction at a non-zero angle with respect to the surface of the storage medium, rather than the parallel direction used in prior read transducer configurations. As a result, the read sensor is more sensitive to the cross-track magnetic field produced by the written data one the storage medium. More specifically, free layer 316 is sensitive to both the perpendicular magnetic field (used for two-state read signals) and the cross-track magnetic field (regarded as noise in two-state read signals) to provide a hybrid read signal of multiple tracks, particularly when using a readback path along a track boundary rather than attempting to follow track center.

FIG. 3 shows two example configurations of magnetization directions. Pinned layers 312.1 and 312.2 have magnetization directions 314.1 and 314.2 that form non-zero angles with the surface of storage medium 320 in the cross-track direction. Pinned layers 312.1 and 312.2 have magnetization directions out of the plane from the storage medium surface, with an acute angle to the surface, not perpendicular. Free layers 316.1 and 316.2 have magnetization directions 318.1 and 318.2 that form non-zero angles with the surface of storage medium 320 in the cross-track direction. Free layers 316 may have magnetization bias configured to increase, relative to the magnetization bias parallel to the surface of the storage medium, free layer sensitivity to cross-track fields from the adjacent tracks. Free layer 316.1 has a magnetization direction out of plane from the storage medium surface, with an acute angle to the surface, not perpendicular. Free layer 316.2 also has a magnetization direction that forms an acute angle to the surface (not perpendicular), but is polarized in the opposite direction from free layer 316.1 and into the plane of the storage medium surface. Pinned layers 312.1 and 312.2 are substantially perpendicular to their respective free layers 316.1 and 316.2. For example, the baseline magnetization directions 318.1 and 318.2 are perpendicular to magnetization directions 314.1 and 214.2, within the design and manufacturing tolerances of the head components. The angle selected may be based on the head response to the media magnetic domains from the track boundary position and may be tuned to achieve a 3:1 ratio of perpendicular amplitude to cross-track amplitude. In a four-state configuration, this would provide signal levels of −3, −1, 1, and 3 for differentiating among the four states.

In some embodiments, read transducers 310 may include a number of structures for positioning, assisting, and protecting free layers 316 and pinned layers 312 within the head component. For example, read transducer 310 may include one or more shields, insulators, and/or magnetic bias structures surrounding and/or separating free layer 316 and pinned layer 312 in a read sensor configuration. More specifically, the read sensor may include an antiferromagnetic (AFM) layer, pinned layer 312, a nonmagnetic spacer layer (between pinned layer 312 and free layer 316), free layer 316, a capping layer, and/or seed layers.

Read transducer 310 may be configured to read two or more adjacent tracks written in sync. For example, a portion of storage medium 320 is shown in FIG. 3 and includes adjacent tracks 322 and 324. Six-bit segments are shown for each of data tracks 322 and 324, where each bit is represented by a magnetic domain that has been magnetized (written) with a positive or negative polarity indicated by a 1 (positive) or a 0 (negative). Each bit is sequential in its respective data track along down-track direction 308 (representing the direction read transducer 310 will pass relative to storage medium during read operations). Data tracks 322 and 324 may be synchronized, where their respective magnetic domains for their corresponding bit values are aligned in the down-track direction. For example, each adjacent set of magnetic domains may start and stop at substantially the same distances in the down-track direction. Synchronized data tracks 322 and 324 each include distinct bit values in their respective bit positions that may define a two-bit value or symbol across the two tracks. For example, down-track position 326.1 may include 10, down-track position 326.2 may include 01, down-track position 326.3 may include 01, down-track position 326.4 may include 10, down-track position 326.5 may include 11, and down-track position 326.6 may include 00.

Read transducer 310 may be positioned over adjacent tracks 322 and 324 at track boundary 330 between them. For example, servo control may position the head radially over one or more target tracks on a disk medium and be configured for a track follow position for readback path 332 along track boundary 330. One or both of adjacent tracks 322 and 324 may be the target track for the read operation, depending on the reading and decoding configuration being used (as described further below). Regardless of whether only one of the tracks is the target track, the resulting read signal from read transducer 310 may be a multi-level signal representing the bit states of the pair of adjacent bits (and corresponding magnetic domains). For example, at down-track position 326.1, read transducer 310 may generate a read signal indicative of 10.

Graphs 340 and 362 further explain the magnetic fields detected by read transducer 310. Graph 340 shows signal amplitudes generated by the perpendicular fields on a readback path along each edge of positive bit 342 and a negative bit 352. Strong positive amplitudes 344 and 346 may be generated along either lateral edge (track boundary) of positive bit 342. Strong negative amplitudes 354 and 356 may be generated along either lateral edge (track boundary) of negative bit 352. Graph 362 shows signal amplitudes generated by the cross-track fields on a readback path along each edge of positive bit 342 and negative bit 352. Moderate negative amplitude 348 may be generated along a first (e.g., left) lateral edge and moderate positive amplitude 350 may be generated along a second and opposite (e.g., right) lateral edge of positive bit 342. Moderate positive amplitude 358 may be generated along a first (e.g., left) lateral edge and moderate negative amplitude 360 may be generated along a second and opposite (e.g., right) lateral edge of negative bit 352. The strong and moderate amplitudes are relative to one another, with the strong amplitudes corresponding to the perpendicular component and the moderate amplitudes corresponding to the cross-track components. The relative difference between the strong and moderate amplitudes assists in distinguishing among the composite multi-level signals sensed by read transducer 310 along the track boundary, which will be a combination of the perpendicular fields from both adjacent tracks and the cross-track fields from both adjacent tracks. As discussed above, the angle of the free layer may be selected to achieve a 3:1 ratio of perpendicular amplitude to cross-track amplitude. In a four-state configuration, this would provide signal levels of −3, −1, 1, and 3 for differentiating among the four states. Note that FIG. 3 shows relative amplitudes with a 2:1 ratio in graphs 340 and 361 and diagrams 370.

Diagrams 370 demonstrate how sensing the four component fields in aggregate yields distinct amplitude levels that correspond to the possible two-bit states of the adjacent magnetic domains. For example, a bit state of 11 may result in read transducer 310 sensing a strong positive signal from the perpendicular fields of both adjacent bits, a moderate negative signal from the cross-track field from the right, and a moderate positive signal from the cross-track field from the left. The superposition or aggregation of these fields may result in the cross-track field components negating one another and resulting signal 372 being double the strong positive signal. A bit state of 01 may result in read transducer 310 sensing a strong negative signal from the perpendicular field of the bit on the left, a strong positive signal from the perpendicular filed of the bit on the right, and moderate positive fields from the cross-track fields of both adjacent bits. The superposition of these fields may result in the perpendicular field components negating one another and resulting signal 374 being double the moderate positive signal. A bit state of 10 may result in read transducer 310 sensing a strong positive signal from the perpendicular field of the bit on the left, a strong negative signal from the perpendicular field of the bit on the right, and moderate negative fields from the cross-track fields of both adjacent bits. The superposition of these fields may result in the perpendicular field components negating one another and resulting signal 376 being double the moderate negative signal. A bit state of 00 may result in read transducer 310 sensing a strong negative signal from the perpendicular fields of both adjacent bits, a moderate positive signal from the cross-track field from the right, and a moderate negative signal from the cross-track field from the left. The superposition of these fields may result in the cross-track field components negating one another and resulting signal 378 being double the strong negative signal. These four distinct signal levels enable a single read signal to correspond to two-bit states. In some embodiments, a read channel may be configured to detect and use the four signal levels to determine the bit states of the data stored on storage medium 320. The angle of the free layer may be tuned to maximize the separation of the different signal levels for the different bit states.

Note that additional configurations are possible where the read transducer spans more than the track boundary of two adjacent tracks (e.g., 3 or more adjacent tracks) and a number of resulting signals, target amplitude levels, and corresponding bit states may be read and decoded. For example, a configuration spanning two track boundaries may correspond to three adjacent bits and the eight possible bit states and resulting signal amplitudes and target amplitude levels for decoding them.

Figure 2:
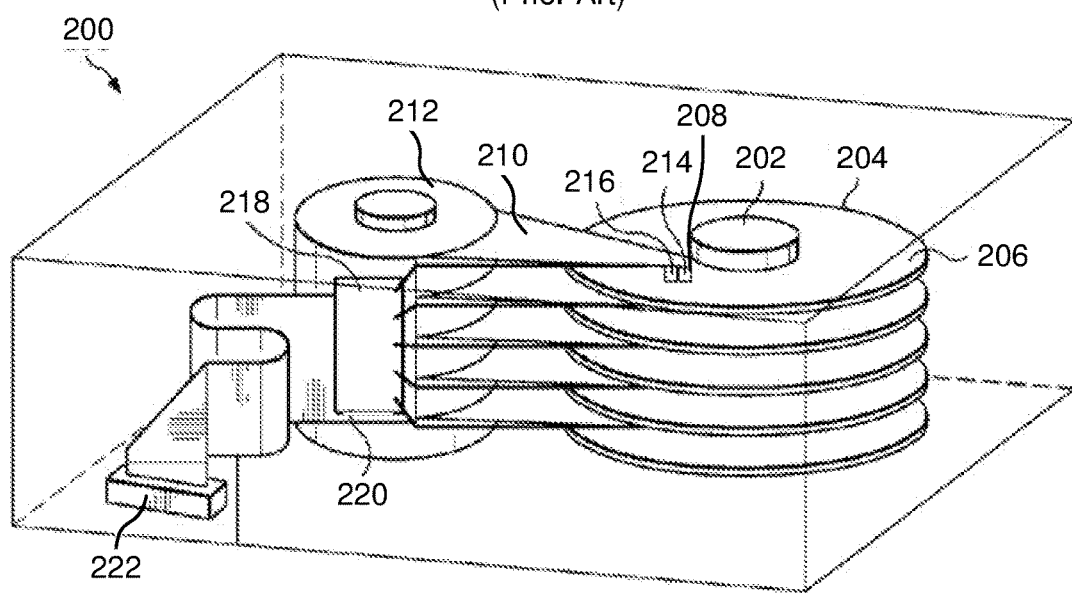
FIG. 2 is a diagram of an example data storage device in the form of a disk drive comprising a heads actuated over disk surfaces.
Figure 4:
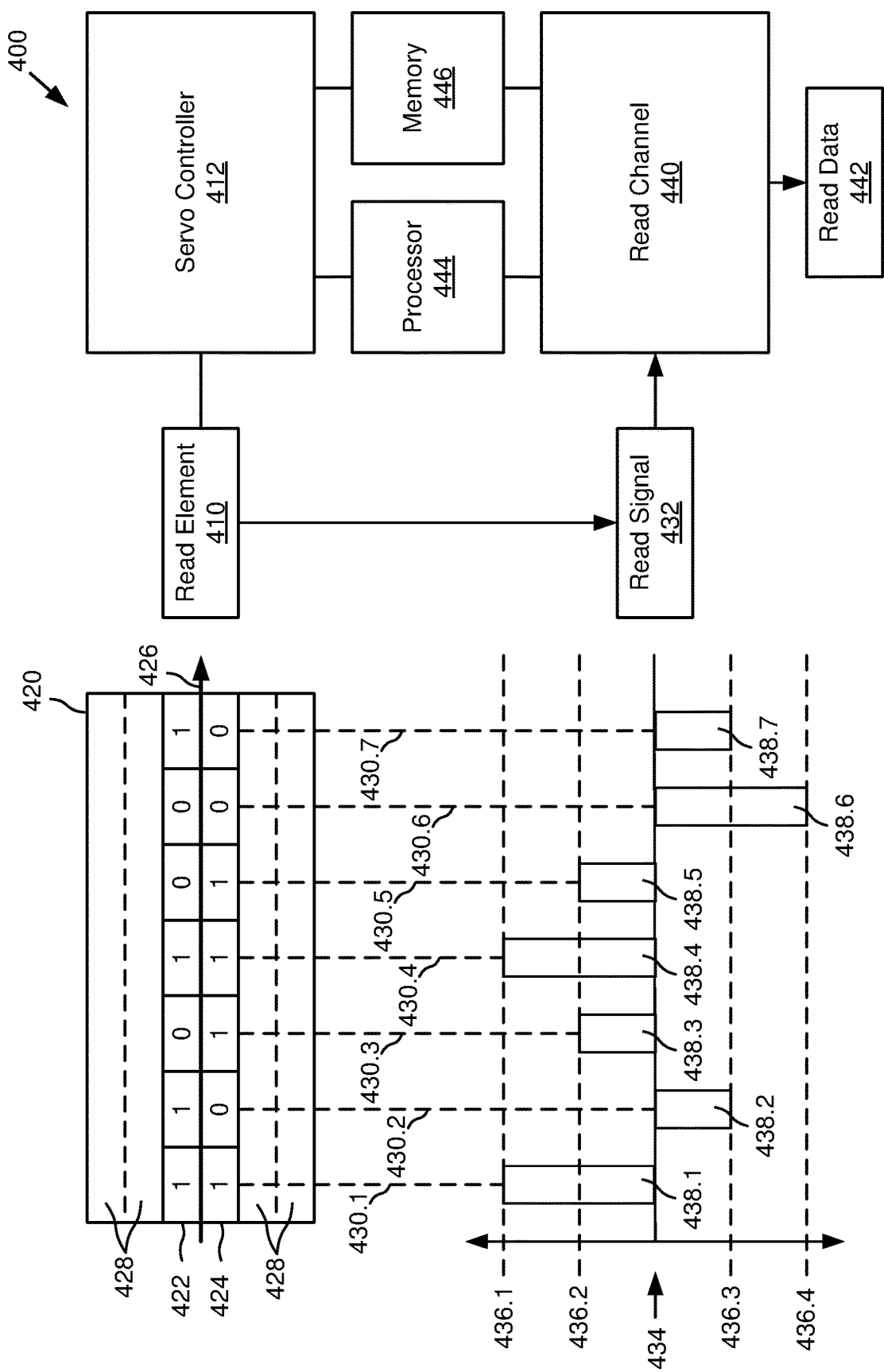
FIG. 4 is a diagram of example drive circuitry, bit patterns in a pair of synchronized tracks, and resulting read signals.

FIG. 4 shows control circuitry 400 for a data storage device configured with a read transducer and storage medium similar to those described with regard to FIG. 3. In some embodiments, control circuitry 400 may comprise a storage device controller configured to receive host storage commands and process storage operations for writing, reading, and managing data stored to non-volatile storage media in the disk drive, such as the magnetic media disks in FIGS. 1 and 2. Control circuitry 400 may be configured to manage servo and read/write operations for one or more actuators, heads, and corresponding writer and read elements.

Read element 410 may include a read transducer positioned by servo controller 412 to read adjacent tracks 422 and 424 on storage medium 420 along readback path 426. Adjacent tracks 422 and 424 may be target data tracks among a plurality of data tracks 428 on storage medium 420.

The plurality of data tracks 428 are assumed to exhibit random data patterns. In some embodiments, servo controller 412 may include a processor and instructions stored in a memory configured to align read element 410 over the track boundary between adjacent tracks 422 and 424 and use feedback from servo sectors to follow the track boundary for readback path 426. Along adjacent tracks 422 and 424 may be synchronized bit pairs 430 corresponding to the bit states previously written to each data track.

In some configurations, the ability to read adjacent tracks in a single pass may enable substantial increases in tracks per inch (TPI) and resulting areal densities, such as doubling TPI relative to prior configurations that may otherwise be limited by the track follow capabilities of the servo system. Assume a prior system with a single read element can achieve a maximum recording density with a track density of TPI_0 and a linear density (bits per inch, BPI) BPI_0. For simplicity, we may ignore track edge effects, such as transition curvature, transition broadening, guard bands, etc. that may not be uniform across-tracks. By targeting the track boundary and only reading every other track boundary, the resulting is TPI=2*TPI_0. Prior recording systems may not have been able to target the track boundary without effectively canceling the perpendicular signals from adjacent bits of different polarities, resulting in read back with a zero amplitude, which would be indistinguishable from lost information or alternating current (AC) erase. Read element 410 may distinguish bit states of the adjacent bit pairs at any combination of polarities. Read element 410 may be configured to readback two adjacent tracks (e.g., adjacent tracks 422 and 424). For example, a block of data involving multiple tracks by conventional magnetic recording (CMR) or shingle magnetic recording (SMR) may be read back at the same time. In an ideal case, the resulting areal density may be BPI_0*2*TPI_0. In the case of SMR, the starting track of each block may be wider and serve as a pilot track, as further explained with regard to FIG. 5C.

Read element 410 may generate a read signal 432 comprising a waveform 434 corresponding to bit pairs 430. For example, each bit pair 430 may generate a corresponding response in read element 410 to generate a waveform signal with an amplitude and polarity corresponding to the superposition of the perpendicular and cross-track magnetic fields at the track boundary of that bit pair. The four possible states of the bit pairs (11, 10, 01, 00) each correspond to a distinct amplitude level 436. For example, 11 bit pairs generate amplitude level 436.1, 01 bit pairs generate amplitude level 436.2, 10 bit pairs generate amplitude level 436.3, and 00 bit pairs generate amplitude level 436.4. Read signal 432 may be comprised of a series of signal amplitudes corresponding to the states of sequential bit pairs. In the example shown, bit pair 430.1 generates amplitude 438.1 at amplitude level 436.1, bit pair 430.2 generates amplitude 438.2 at amplitude level 436.3, bit pair 430.3 generates amplitude 438.3 at amplitude level 436.2, bit pair 430.4 generates amplitude 438.4 at amplitude level 436.1, bit pair 430.5 generates amplitude 438.5 at amplitude level 436.2, bit pair 430.6 generates amplitude 438.6 at amplitude level 436.4, and bit pair 430.7 generates amplitude 438.7 at amplitude level 436.3.

Read signal 432 may be processed by read channel 440 to output read data 442. For example, read channel 440 may receive read signal 432 as an analog read signal corresponding to waveform 434, subject to noise generated by the write, read, servo, and electrical transmission processes. Read channel 440 may determine channel timing, convert the analog read signal into a digital read signal corresponding to amplitude values with timing corresponding to expected bit locations, and evaluate the signal amplitudes at those bit locations to determine which bit states they represent. Read channel 440 may be configured with the four amplitude levels 436 and use those values to evaluate read signal 432 for bit value determinations. For example, read channel 440 may include iterative bit detectors and decoders that compare the digital amplitude signals to amplitude levels 436 in the context of encoded symbols and parity information, in order to determine read data 442 for further processing by the data storage device and/or return to a host system via a host interface.

In some embodiments, circuitry 400 may comprise one or more processors 444 and memories 446 for supporting the operations of read channel 440, servo controller 412, and/or other data storage device controller functions. For example, a storage device controller may include controller processor and memory resources for use by electrical subcomponents, such as servo controller 412 and read channel 440 and/or each subcomponent may include a dedicated or shared set of processor and memory resources. For example, read channel 440 may include processor 444 and memory 446 shared with write channel functions and other shared processing resources (for a read/write channel component) and servo controller 412 may include its own servo processor and servo logic. In some embodiments, one or both of servo controller 412 and read channel 440 may be embodied in separate packages, such as application specific integrated circuits (ASICs), systems on a chip (SOCs), or other specialized circuits that interface with processor 444 and memory 446 for carrying out their respective functions. Storage device controllers including circuitry 400 may include physical and electrical interfaces for connecting to buffer memories, power sources, preamplifiers (for read/write signals to and from the head), motor controllers (for spindle and actuator control), other controllers, and/or other circuitry components. In some embodiments, circuitry 400 may be interconnected by a bus that includes one or more conductors that permit communication among the components. For example, processor 444, memory 446, servo controller 412, and read channel 440 may be components attached to a printed circuit board assembly (PCBA) that provides one or more layers of interconnect conductors among the components.

Processor 444 may include any type of conventional processor or microprocessor that interprets and executes instructions. Memory 446 may include a random access memory (RAM) or another type of dynamic storage device that stores information and instructions for execution by processor 444 and/or a read only memory (ROM) or another type of static storage device that stores static information and instructions for use by processor 444 and/or any suitable storage element, such as a system portion of a hard disk media or a solid state storage element. Memory 446 may be configured to store firmware instructions comprising one or more modules or sub-modules for specific data storage device operations and processor 444 may execute those instructions, including controlling communication with other components, such as servo controller 412 and read channel 440. Memory 446 may include buffer memory configured to store data during various stages of processing, such as buffering digital read signal data for multiple read passes and/or adjacent data tracks (including data blocks comprised of multiple data tracks), to allow read channel 440 to process bit pairs from adjacent tracks (including more than two adjacent tracks) in a single dual track, overlapping read, and/or block read decoding process.

Control circuitry 400 may include or access a host interface that includes any transceiver-like mechanism that enables the data storage device to communicate with other devices and/or systems, such as a host system for which the storage device provides data storage. The host interface may comprise a host storage interface compliant with one or more storage interface standards, such as a Serial Advanced Technology Attachment (SATA) interface, a Small Computer System Interface (SCSI), serial attached SCSI (SAS), peripheral computer interface express (PCIe) (e.g., Non-Volatile Memory Express (NVMe)), etc., for connecting the host interface to a peripheral interface or network port.

Read channel 440 may include one or more specialized read channel circuits configured for processing the analog read signal from the storage medium surfaces back into binary data. In some embodiments, read channel 440 may be part of a read/write channel that is also configured for processing binary data to be written to the disk surfaces using an analog write signal. For example, a read/write channel may include a write path comprised of various data scramblers, run-length limited (RLL) encoders, iterative error correction code (ECC) encoders, precompensation circuits, and other data or signal processing components. Read channel 440 may include a read path comprised of various amplifiers, filters, equalizers, analog-to-digital converters (ADCs), soft information detectors, iterative ECC decoders, and other data or signal processing components. Read channel 440 may include amplitude levels 436 as configurable parameters used to detect and decode the digital waveform converted from read signal 432. Read channel 440 may include read logic configured to determine a pattern of readback paths, expected read signals, and relationships among those read signals for detecting and decoding data within and across adjacent data tracks, such as adjacent tracks 422 and 424.

Servo controller 412 may include one or more specialized circuits configured to process servo data, such as position error signals, from the storage medium surfaces and providing a control signal to position the actuators in a closed-loop control system. Servo controller 412 may also receive commands from processor 444 for positioning operations, such as seek, track follow, load, unload, sweep, idle, and other actuator positioning operations. Servo controller 412 may also implement servo error recovery processes for recovering from servo errors. In some embodiments, servo controller 412 may include servo processor and servo logic stored in a servo memory. For example, the servo processor may be a dedicated processor circuit and the servo logic may be firmware stored in RAM associated with the dedicated processor to provide dedicated computing resources for managing the servo functions. Servo controller 412 may provide servo control signals to motor controllers for controlling one or more actuator VCMs and/or a spindle motor for rotating a disk stack.

Figure 5A:
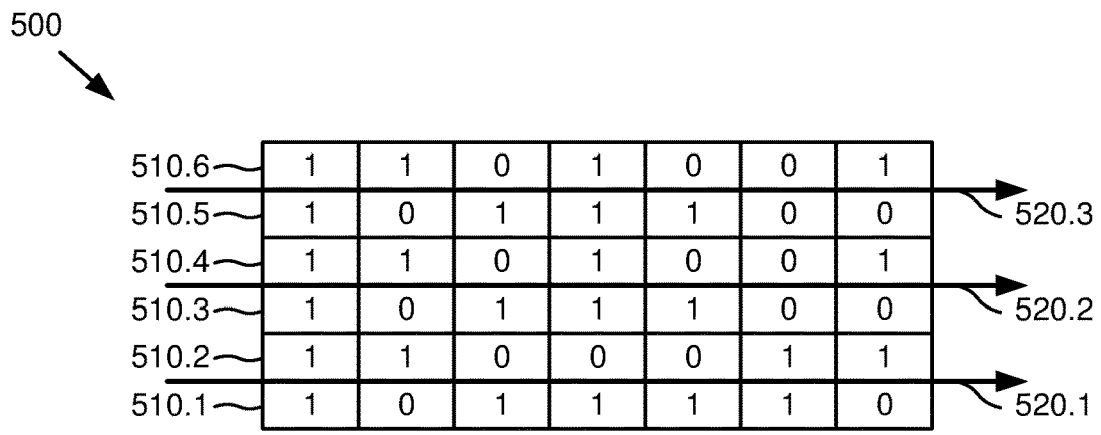
FIGS. 5A, 5B, and 5C are diagrams of example readback paths for different read and decode configurations.
Figure 5B:
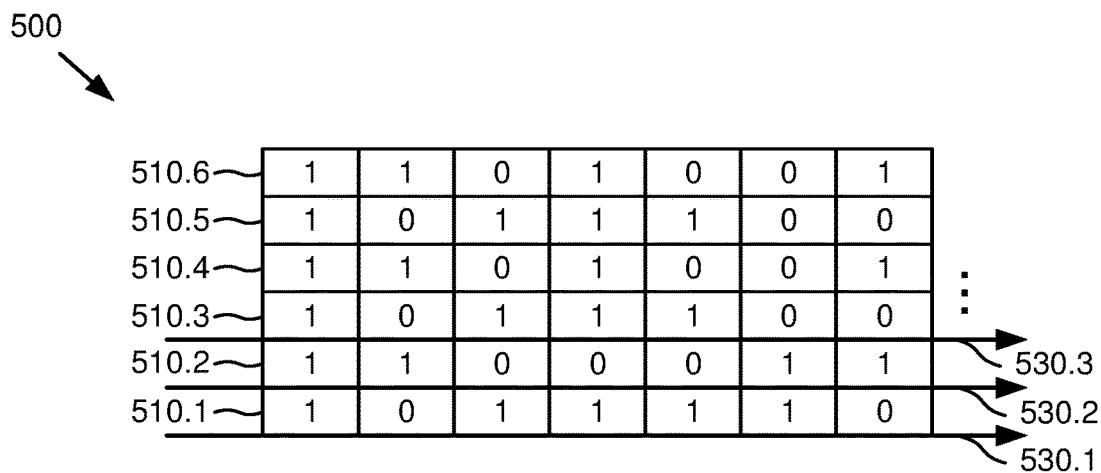
Figure 5C:
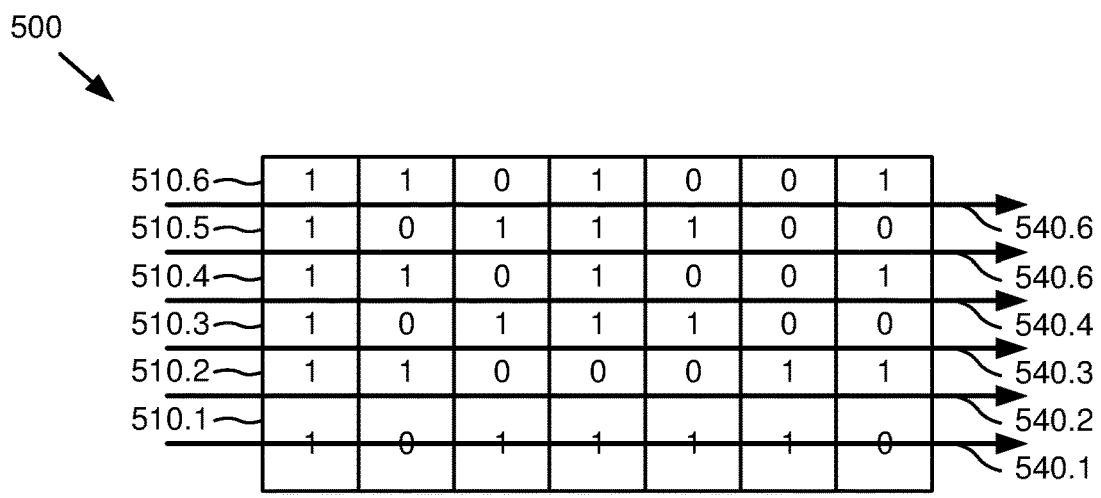

FIGS. 5A, 5B, and 5C show a series of consecutively adjacent tracks 510.1-510.6, such as concentric tracks on a disk storage medium or laterally adjacent tracks of a tape storage medium, for a read transducer and storage medium system 500. Each of FIGS. 5A, 5B, and 5C show different configurations for reading (and decoding) the bit data contained in data tracks 510. For example, each figure includes two or more readback paths 520, 530, 540 traversing readback locations for reading the data block. While six adjacent tracks are shown for each example, the actual number of adjacent tracks involved in each data block may be based on the block size, bits per inch (BPI), and other storage medium formatting considerations and may vary, even across the same storage medium. In some embodiments, block size may correspond to the host read block size used for writing to and reading from the data storage device, such as 512 bytes, 1024 bytes, 4048 (4K) bytes, or another host block format, and may span two or more adjacent tracks. In some embodiments, each data track in the data block may be written with synchronized magnetic domains and aligned bit lengths and boundaries. For the descriptions below, a single read element may be assumed. However, other configurations may use multiple read elements operating in parallel, particularly for tape drive implementations. Additional readers may be added to further assist the readback and decoding of the read signals and resulting bit streams, such as a plurality of configurations with each read element separated in the cross-track and down track positions.

FIG. 5A shows a configuration using readback paths 520 for every other track boundary. For example, readback path 520.1 may provide the read signal for decoding adjacent tracks 510.1 and 510.2, readback path 520.3 may provide the read signal for decoding adjacent tracks 510.3 and 510.4, and readback path 520.3 may provide the read signal for decoding adjacent tracks 510.5 and 510.6. In some configurations, a read channel may decode each pair of adjacent tracks in parallel and return the decoded bit data for those tracks for buffering and/or return to the host system as the pair of tracks are decoded. For example, a single readback pass may result in a single decoding operation for the pair of tracks. In some configurations, the read channel and/or the storage device controller may aggregate the decoded bit data for each pair of tracks in the data block and return the host data block when all of the decoded bit data for the block has been read and decoded. This configuration may be used to double the data rate of prior systems that use a read pass for every track.

FIG. 5B shows a configuration using readback paths 530 for every track boundary and sequential decoding of each target track based on the read passes on both edges (track boundaries). For example, data track 510.1 may be the target track for a read operation and a first pass may be made along readback path 530.1 and a second pass along readback path 530.2. Data track 510.2 may be the target track for a next read operation, with the first pass being along readback path 530.2 (the track boundary between adjacent tracks 510.2 and 510.1) and the second pass being along readback path 530.3 (the track boundary between adjacent tracks 510.2 and 510.3). The read signal from the first pass may buffered and/or partially decoded by the read channel during the second pass. When the read signal for the second pass has been received by the read channel, the bit pairs for each track boundary may be determined and jointly used for iterative decoding of the most likely bit states for the target track. For example, the amplitude from the read signals of both track boundaries may be used to determine the bit pairs overlapping with each adjacent track and the decoder logic of the read channel may determine the most likely bit state in the target track based on the two read passes. This may reduce the bit error rate of the system compared to FIG. 5A, at the cost of not increasing the data rate compared to prior systems. In sequential reads for a data block, the second read pass for the prior adjacent data track may be buffered and used as the first read pass for the next adjacent data track. In some configuration, the decoded bit data for each target track may be returned as it is decoded after its respective second pass. In some configurations, the decoded bit data for each target track may be buffered until the data block is complete and/or the read data may be buffered across all of the sequential read passes for the data block and the entire data block may be decoded in a single decode operation.

FIG. 5C shows a configuration using readback paths 540 for every track boundary for data block-level decoding operations and further includes an optional pilot track 510.1 for supporting SMR formatted data storage devices. As with FIG. 5B, each track boundary, starting with readback path 540.2, may be a readback path for sequential track read operations across the plurality of data tracks in the data block. Data track 510.1 may be configured as a pilot track with a track width greater than the track widths of the other data tracks 510.2-510.6. Readback path 540.1 may traverse data track 510.1 within the width of the data track, rather than on the track boundary, due to the wider track width. Each additional read pass may follow the respective track boundaries of each sequential set of adjacent tracks. For example, readback path 540.2 may follow the track boundary between adjacent tracks 510.1 and 510.2, readback path 540.3 may follow the track boundary between adjacent tracks 510.2 and 510.3, readback path 540.4 may follow the track boundary between adjacent tracks 510.3 and 510.4, readback path 540.5 may follow the track boundary between adjacent tracks 510.4 and 510.5. and readback path 540.6 may follow the track boundary between adjacent tracks 510.5 and 510.6. In sequential reads for the data block, the second read pass for the prior adjacent data track may be buffered and used as the first read pass for the next adjacent data track. Each data track, other than the first track and the last track may be read twice sequentially, once on the first edge (track boundary) and once on the second edge (track boundary). In some configurations, the decoded bit data for each target track may be returned as it is decoded after its respective second pass and joint decoding based on the two passes. In some configuration, the read data may be buffered across all of the sequential read passes for the data block and the entire data block may be decoded in a single decode operation.

Figure 6:
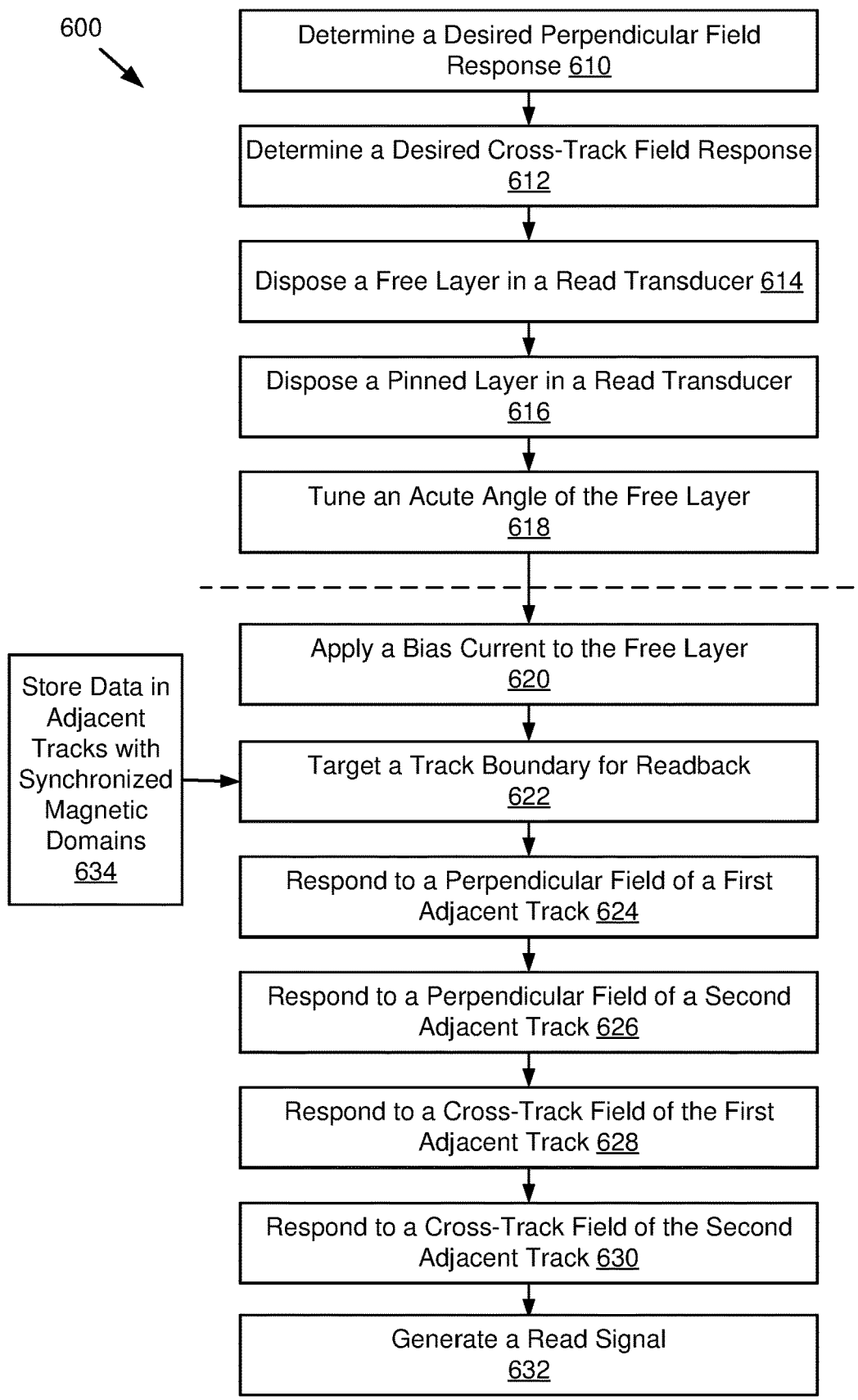
FIG. 6 is an example method of generating a multi-level read signal.

As shown in FIG. 6, read transducer 310 and control circuitry 400 may be operated according to an example method of generating a multi-level read signal, i.e., according to the method 600 illustrated by blocks 610-634.

At block 610, a desired perpendicular field response may be determined. For example, the target amplitude for the perpendicular field sensitivity at a track boundary may be determined for a particular head/media and/or head/media/channel configuration.

At block 612, a desired cross-track field response may be determined. For example, the target amplitude for the cross-track field sensitivity at a track boundary may be determined for a particular head/media and/or head/media/channel configuration.

At block 614, a free layer may be disposed in a read transducer. For example, a manufacturer may deposit a free layer material in the reader structure of a read head.

At block 616, a pinned layer may be deposited in the read transducer. For example, the manufacturer may deposit a pinned layer material adjacent the free layer material and separated by a non-magnetic spacer layer.

At block 618, an acute angle of the free layer may be tuned. For example, the magnetization direction of a bias current may be determined that creates an acute angle with the surface of the storage medium (and/or air bearing surface of the head) to generate the desired perpendicular field response and desired cross-track field response of blocks 610 and 612 based on the free layer sensitivity.

At block 620, a bias current may be applied to the free layer. For example, in operation, a storage device controller may apply a bias current to the free layer during read operations.

At block 622, a track boundary may be targeted for readback. For example, the storage device controller may control the position of the read transducer over the storage medium to follow the track boundary for one or more target tracks during read operations.

At block 624, the read transducer may respond to a first perpendicular field of a first adjacent track to the track boundary. At block 626, the read transducer may respond to a second perpendicular field of a second adjacent track to the track boundary. At block 628, the read transducer may respond to a first cross-track field of the first adjacent track. At block 630, the read transducer may respond to the second cross-track field of the second adjacent track. For example, the read transducer may generate a response amplitude equal to the superposition of the responses from blocks 624, 626, 628, and 630 based on their collective influence on the free layer of the read transducer.

At block 632, a read signal may be generated. For example, the read transducer may generate a read signal corresponding to the amplitudes of sequential bit pairs in an analog waveform output to a read channel.

At block 634, prior to readback by the read transducer, data may be stored in adjacent tracks with synchronized magnetic domains. For example, a write element of the data storage device may have previously written host data to the adjacent tracks with synchronized magnetic domains corresponding to their respective bit states.

Figure 7:
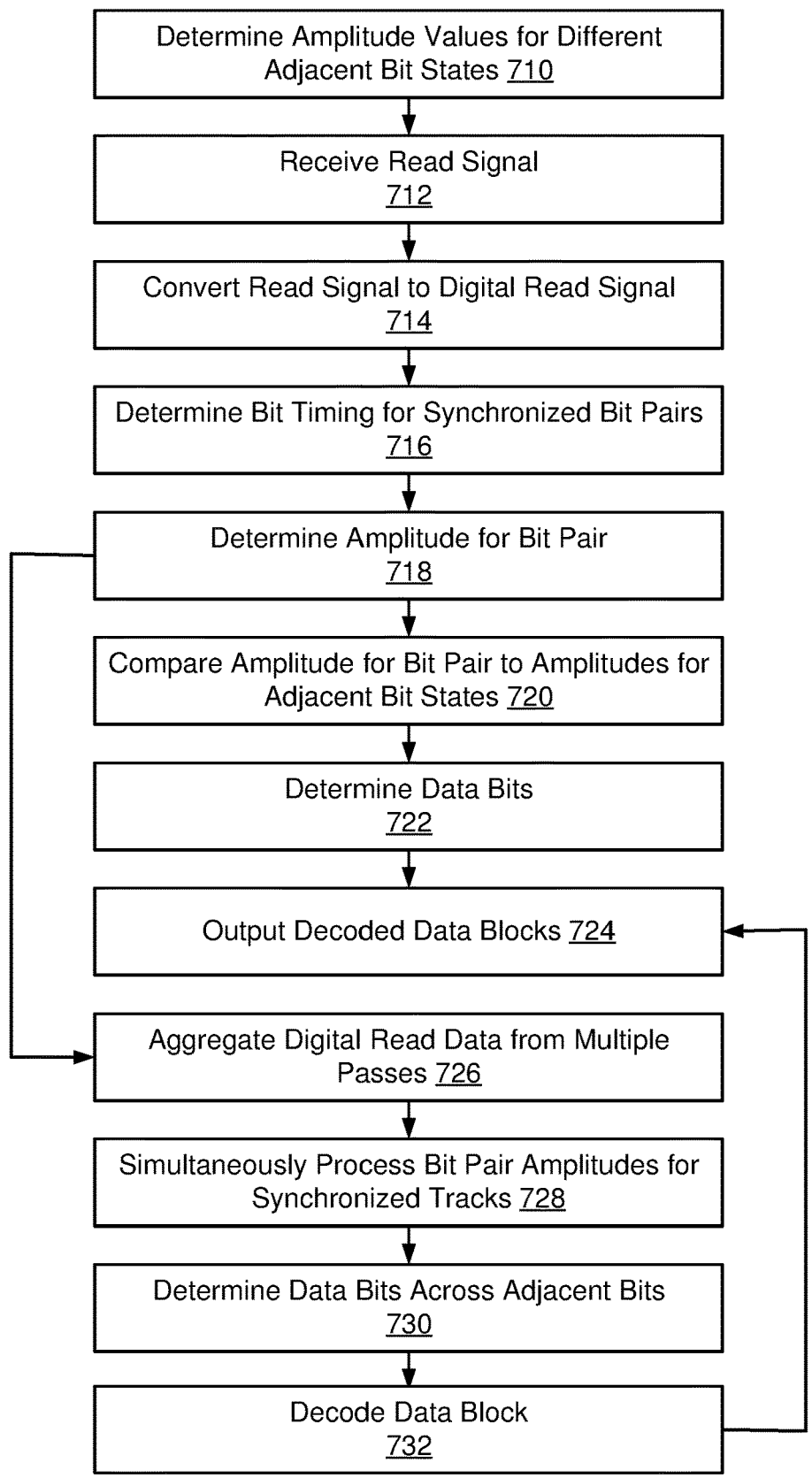
FIG. 7 is an example method of processing the multi-level read signal.

As shown in FIG. 7, read transducer 310 and control circuitry 400 may be operated according to an example method of decoding bitstream data from a multi-level read signal, i.e., according to the method 700 illustrated by blocks 710-732.

At block 710, amplitude values for different adjacent bit states may be determined. For example, a read channel circuit may be configured with four amplitude values representing the different bit states for adjacent bit pairs in synchronized data tracks.

At block 712, a read signal may be received. For example, the read channel may receive an analog read signal representing the waveforms read from a storage medium by a read transducer on the track boundary between adjacent data tracks.

At block 714, the analog read signal may be converted to a digital read signal. For example, an analog-to-digital converter (ADC) in the read channel circuit may sample analog amplitude values and convert them to corresponding digital values in a digital stream.

At block 716, the bit timing for synchronized bit pairs may be determined. For example, the read channel circuit may determine read channel timing for isolating one or more digital amplitude values corresponding to per bit timing in the digital read signal.

At block 718, an amplitude value may be determined for each bit pair. For example, based on the bit timing to separate sequential amplitude values, the read channel circuit may determine at least one amplitude value from the digital read signal for a synchronized bit pair across adjacent tracks.

At block 720, the amplitude of the bit pair may be compared to the amplitudes for adjacent bit states. For example, the read channel circuit may compare the amplitude value determined at block 718 to the four amplitude values determined at block 710 to determine a most likely match between the read signal amplitude and the amplitudes corresponding to the various bit states.

At block 722, the data bits for one or more bits of the bit pair may be determined. For example, based on the closest bit state amplitude level determined through iterative bit detection and decoding, the read channel circuit may determine the bit states for the bit pair and return one or both bit values as decoded data bits.

At block 724, decoded data blocks may be output. For example, the read channel circuit may output a data block or portion thereof based on sequential data bits for one or more target data tracks.

In some configurations, at block 726, digital read data from multiple readback passes may be aggregated. For example, the read channel circuit may buffer read data from multiple passes of adjacent data tracks corresponding to a data block.

At block 728, bit pair amplitudes for synchronized data tracks may be processed simultaneously. For example, the read channel circuit may use the read data buffered from passes on both track boundaries of a single target track and/or multiple passes for each track boundary in a sequence of two or more adjacent tracks to determine bit states across synchronized bits in two or more data tracks.

At block 730, data bits may be determined across adjacent bits. For example, the read channel circuit may iteratively process the possible bit values across two or more adjacent bits in the cross-track direction to determine the most likely bit values for those adjacent bits.

At block 732, a data block may be decoded based on multiple adjacent data tracks. For example, the read channel circuit may receive and buffer readback data for each adjacent data track contributing to a target data block and decode the data bits across all tracks in a single decode operation passes all decoded bits for the data block to be output from the read channel circuit. Method 700 may return to block 724 to output the decoded data block.

Figure 8:
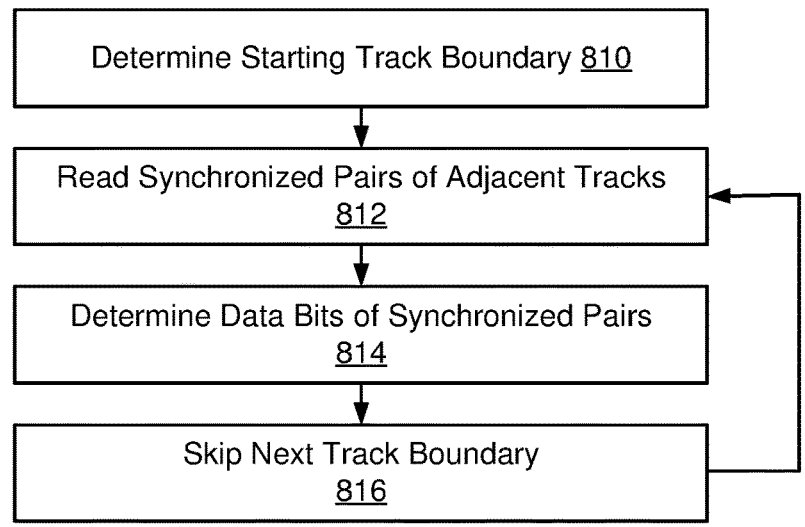
FIG. 8 is an example method of reading and decoding multi-level read signals.

As shown in FIG. 8, read transducer 310 and control circuitry 400 may be operated according to an example method of reading and decoding multi-level read signals, i.e., according to the method 800 illustrated by blocks 810-816.

At block 810, a starting track boundary may be determined. For example, a storage device controller may select a track boundary corresponding to at least one target data track.

At block 812, synchronized bit pairs of adjacent tracks may be read. For example, the storage device controller may target a readback pass along the track boundary between two adjacent target data tracks to generate a read signal with amplitude values corresponding to a multi-level read signal for the adjacent bit pair.

At block 814, data bits may be determined for the synchronized bit pairs. For example, the storage device controller may decode the sequence of bit pairs along the readback path to return decoded data bits for both adjacent tracks.

At block 816, a next track boundary may be skipped. For example, the storage device controller may target a next readback pass along the next track boundary between two adjacent data tracks that do not include the two adjacent tracks in the prior pass.

Figure 9:
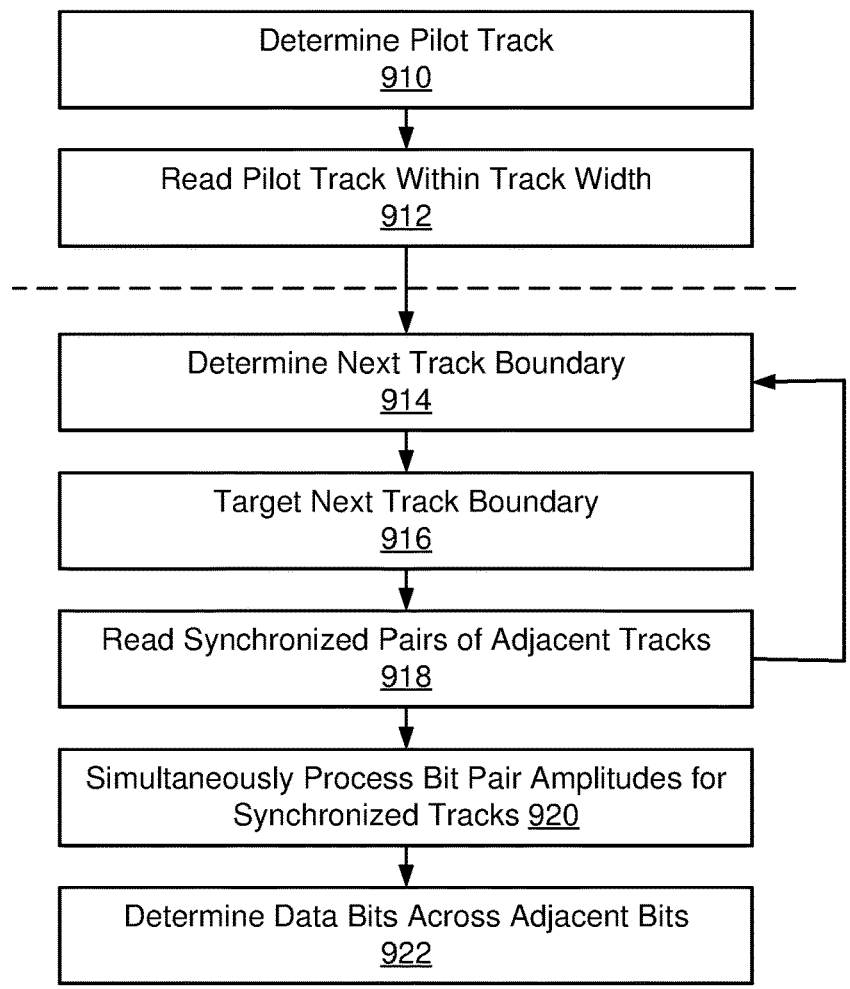
FIG. 9 is another example method of reading and decoding multi-level read signals.

As shown in FIG. 9, read transducer 310 and control circuitry 400 may be operated according to another example method of reading and decoding multi-level read signals, i.e., according to the method 900 illustrated by blocks 910-922.

At block 910, a pilot track may be determined. For example, a storage device controller may select a pilot track with a greater track width than other data tracks as a starting point for a data block read operation.

At block 912, the pilot track may be read within the track width. For example, the storage device controller may target a readback path within the track width of the pilot track, rather than a track boundary on the edge of the pilot track, and buffer the read signal for processing.

At block 914, a next track boundary may be determined. For example, the storage device controller may determine a next track boundary between adjacent tracks corresponding to a data block, starting with the track boundary between the pilot track and a next data track with a normal track width.

At block 916, the next track boundary may be targeted for a readback pass. For example, the storage device controller may target the next track boundary for a readback pass.

At block 918, the synchronized pairs from adjacent tracks for the targeted track boundary may be read. For example, the storage device controller may target the readback path along the targeted track boundary and buffer the read signal for processing. Method 900 may return to block 914 for each additional track boundary and adjacent track within the data block.

At block 920, bit pair amplitudes for synchronized data tracks may be simultaneously processed. For example, the storage device controller may simultaneously process the read signal data read and buffered at blocks 912 and 918.

At block 922, determine data bits across adjacent bit pairs. For example, the storage device controller my decode the bit pair amplitude values in a single decode operation to output the data bits for the data block.

Figure 10:
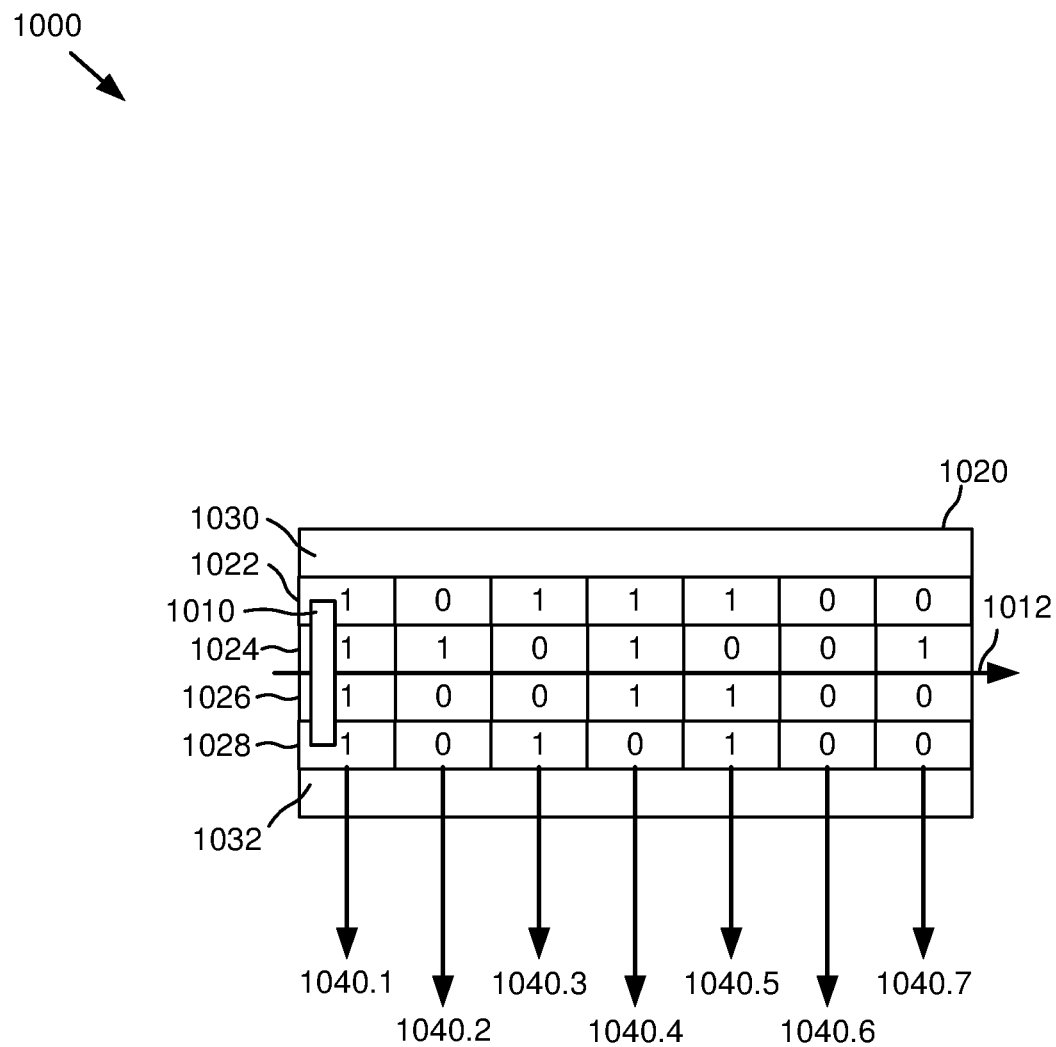
FIG. 10 is a diagram of an example readback path for a wide read transducer positioned over four data tracks.

While the foregoing description has focused on the use of a single reader following a single track boundary to generate a read signal corresponding to the four possible two-bit states, this has been done for simplicity of description and the same approach may be applied to reading more than two tracks simultaneously with commensurately higher numbers of distinct bit states across the adjacent (magnetic bit domains aligned) tracks. For example, as shown in FIG. 10, a wide read transducer 1010 may be positioned over media 1020 to read the track boundaries among four tracks 1022, 1024, 1026, 1028 (three track boundaries). Read transducer 1010 has a read transducer width that is greater than the track width of any single track to span multiple track boundaries and determine signals from greater than two synchronized adjacent tracks. The resulting set of bit values across the four tracks are equivalent to four-bit symbols having 16 possible states. As described above, the combination of perpendicular track and cross-track fields across the track boundaries may be summed by read transducer 1010 and result in read signal amplitude values 1040 reflecting the 16 possible states of the four adjacent bits. For example, read transducer 1010 traveling along read path 1012 may generate read signal 1040.1 from bits 1111, read signal 1040.2 from bits 0100, read signal 1040.3 from bits 1001, read signal 1040.4 from bits 1110, read signal 1040.5 from bits 1011, read signal 1040.6 from bits 0000, and read signal 1040.7 from bits 0100. As with FIG. 4, adjacent tracks 1030 and 1032 may be assumed to be random data patterns that do not materially impact the read signals from the three track boundaries under read transducer 1010.

Technology for improving areal density in data storage devices using a read transducer with an angled free layer to read adjacent bit states along a track boundary is described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), erasable programmable read-only memories (EPROMs), electrically erasable programmable read-only memories (EEPROMs), magnetic or optical cards, flash memories including universal serial bus (USB) keys with non-volatile memory or any type of media suitable for storing electronic instructions, each coupled to a computer system bus.

The disclosed technologies can take the form of an entire hardware implementation, an entire software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A data storage device comprising:
a storage medium;
a read transducer, comprising:
a free layer configured to have a magnetization bias sensitive to an external magnetic field, wherein a direction of the magnetization bias forms an acute angle relative to a surface of the storage medium generating the external magnetic field; and
a pinned layer configured to have a fixed magnetization, wherein a direction of the fixed magnetization forms a substantially right angle with the magnetization bias of the free layer; and
a controller configured to cause the read transducer to:
target a readback location on a track boundary between adjacent tracks on the surface of the storage medium; and
generate a read signal indicative of perpendicular fields of the adjacent tracks and cross-track fields of the adjacent tracks.

2. The data storage device of claim 1, wherein:
the adjacent tracks comprise a first data track and a second data track; and
the read signal includes a signal amplitude that is a superposition of a response of the free layer to:
the perpendicular field of the first data track;
the perpendicular field of the second data track;
the cross-track field of the first data track; and
the cross-track field of the second data track.

3. The data storage device of claim 2, wherein:
the read signal corresponds to a first magnetic domain in the first data track and a second magnetic domain in the second data track;
the first magnetic domain indicates a first bit state;
the second magnetic domain indicates a second bit state;
the first magnetic domain and the second magnetic domain are synchronized in a down-track direction; and
the signal amplitude indicates a combination of the first bit state and the second bit state.

4. The data storage device of claim 1, wherein the acute angle of the magnetization bias of the free layer is configured to increase, relative to a magnetization bias parallel to the surface of the storage medium, free layer sensitivity to cross-track fields from the adjacent tracks.

5. The data storage device of claim 1, further comprising:
a read channel circuit configured to:
receive the read signal from the read transducer; and
determine data bits for the adjacent tracks from the read signal.

6. The data storage device of claim 5, wherein:
the read channel circuit is further configured to:
determine a plurality of amplitude values corresponding to adjacent data bit states for the adjacent tracks; and
convert the read signal into a digital stream of amplitude values; and
determining data bits for the adjacent tracks is based on comparing amplitude values from the digital stream to the plurality of amplitude values corresponding to the adjacent data bit states for the adjacent tracks.

7. The data storage device of claim 5, wherein:
the controller is further configured to cause the read transducer to:
read a first track of the adjacent tracks on a first track boundary on a first pass; and
read the first track on a second track boundary on a second pass; and
the read channel circuit is further configured to determine the data bits for the first track using the read signals from the first pass and the second pass.

8. The data storage device of claim 1, wherein:
the storage medium includes a series of adjacent tracks;
the series of adjacent tracks includes synchronized pairs of adjacent tracks with magnetic domains aligned in a down-track direction; and
the controller is further configured to cause the read transducer to read the synchronized pairs of adjacent tracks in a single pass on every other track boundary.

9. The data storage device of claim 1, wherein:
the storage medium includes a targeted track between a first adjacent track and a second adjacent track; and
the controller is further configured to cause the read transducer to:
target a first readback location on a first track boundary between the targeted track and the first adjacent track on a first pass; and
target a second readback location on a second track boundary between the targeted track and the second adjacent track on a second pass.

10. The data storage device of claim 1, wherein:
the storage medium includes a plurality of adjacent tracks corresponding to a data block;
a first track of the plurality of adjacent tracks has a greater track width than a track width of other tracks of the plurality of adjacent tracks;
the controller is further configured to cause the read transducer to:
target a readback location within the greater track width of the first track; and
target readback locations on track boundaries between each adjacent track of the plurality of adjacent tracks; and
a read channel processes read signals for the plurality of adjacent tracks in a single decoding operation.

11. The data storage device of claim 1, wherein:
the storage medium includes a plurality of adjacent target tracks;
the plurality of adjacent target tracks includes greater than two synchronized adjacent tracks with magnetic domains aligned in a down-track direction;
the read transducer has a transducer width greater than a track width of at least one track of the plurality of adjacent target tracks;
the readback location targets a plurality of track boundaries in a single readback pass; and
the read signal is indicative of perpendicular fields of the plurality of adjacent target tracks and cross-track fields of the plurality of adjacent target tracks.

12. A method comprising:
targeting, with a read transducer, a readback location on a track boundary between adjacent tracks on a surface of a storage medium of a data storage device, wherein the read transducer comprises:
a free layer having a magnetization bias sensitive to an external magnetic field, wherein a direction of the magnetization bias forms an acute angle relative to the surface of the storage medium generating the external magnetic field; and a pinned layer having a fixed magnetization, wherein a direction of the fixed magnetization forms a substantially right angle with the magnetization bias of the free layer; and generating, by the read transducer, a read signal indicative of perpendicular fields of the adjacent tracks and cross-track fields of the adjacent tracks.

13. The method of claim 12, wherein:

the adjacent tracks comprise a first data track and a second data track; and the read signal includes a signal amplitude that is a superposition of a response of the free layer to:
the perpendicular field of the first data track;
the perpendicular field of the second data track;
the cross-track field of the first data track; and
the cross-track field of the second data track.

14. The method of claim 13, wherein:

the read signal corresponds to a first magnetic domain in the first data track and a second magnetic domain in the second data track;

the first magnetic domain indicates a first bit state;
the second magnetic domain indicates a second bit state;
the first magnetic domain and the second magnetic domain are synchronized in a down-track direction; and
the signal amplitude indicates a combination of the first bit state and the second bit state.

15. The method of claim 12, further comprising:

determining a desired perpendicular field response for the read transducer;

determining a desired cross-track field response for the read transducer; and tuning the acute angle of the magnetization bias of the free layer to meet the desired perpendicular field response and the desired cross-track field response, wherein the acute angle of the magnetization bias of the free layer is configured to increase, relative to a magnetization bias parallel to the surface of the storage medium, free layer sensitivity to cross-track fields from the adjacent tracks.

16. The method of claim 12, further comprising:

determining a plurality of amplitude values corresponding to adjacent data bit states for the adjacent tracks; and receiving, by a read channel, the read signal from the read transducer; and converting, by the read channel, the read signal into a digital stream of amplitude values;

comparing, by the read channel, amplitude values from the digital stream to the plurality of amplitude values corresponding to the adjacent data bit states for the adjacent tracks; and determining, by the read channel, data bits for the adjacent tracks based on comparing the amplitude values from the digital stream to the plurality of amplitude values.

17. The method of claim 12, further comprising:

reading, with the read transducer, a first track of the adjacent tracks on a first track boundary on a first pass; and reading, with the read transducer, the first track on a second track boundary on a second pass; and determining data bits for the first track using the read signals from the first pass and the second pass.

18. The method of claim 12, further comprising:

reading, with the read transducer, synchronized pairs of adjacent tracks in a single pass on every other track boundary of a series of adjacent tracks, wherein:

the storage medium includes the series of adjacent tracks; and the synchronized pairs of adjacent tracks have magnetic domains aligned in a down-track direction.

19. The method of claim 12, further comprising:

targeting, with the read transducer, a first readback location on a first track boundary between a targeted track and a first adjacent track on a first pass; and targeting, with the read transducer, a second readback location on a second track boundary between the targeted track and a second adjacent track on a second pass, wherein the targeted track is between the first adjacent track and the second adjacent track.

20. The method of claim 12, further comprising:

targeting, with the read transducer, a readback location within a greater track width of a first track of a plurality of adjacent tracks corresponding to a data block, wherein the greater track width is greater than a track width of other tracks of the plurality of adjacent tracks;

targeting, with the read transducer, readback locations on track boundaries between each adjacent track of the plurality of adjacent tracks; and processing read signals for the plurality of adjacent tracks in a single decoding operation.

21. The method of claim 12, wherein:

the storage medium includes a plurality of adjacent target tracks;

the plurality of adjacent target tracks includes greater than two synchronized adjacent tracks with magnetic domains aligned in a down-track direction;

the read transducer has a transducer width greater than a track width of at least one track of the plurality of adjacent target tracks;

the readback location targets a plurality of track boundaries in a single readback pass; and the read signal is indicative of perpendicular fields of the plurality of adjacent target tracks and cross-track fields of the plurality of adjacent target tracks.

22. A data storage device comprising:

a non-volatile storage medium;

a read transducer comprising:

a free layer having a magnetization bias sensitive to an external magnetic field, wherein a direction of the magnetization bias forms an acute angle relative to a surface of the non-volatile storage medium generating the external magnetic field; and a pinned layer having a fixed magnetization, wherein a direction of the fixed magnetization forms a substantially right angle with the magnetization bias of the free layer; and means for targeting, with the read transducer, a readback location on a track boundary between adjacent tracks on the surface of the non-volatile storage medium;

means for generating, by the read transducer, a read signal indicative of perpendicular fields of the adjacent tracks and cross-track fields of the adjacent tracks; and means for determining data bits for the adjacent tracks based on the read signal.

23. A read transducer comprising:

a free layer having a magnetization bias sensitive to an external magnetic field, wherein a direction of the magnetization bias forms an acute angle relative to an air bearing surface of a read head; and a pinned layer having a fixed magnetization, wherein a direction of the fixed magnetization forms a substantially right angle with the magnetization bias of the free layer; and wherein the read transducer is configured for:
  positioning over a readback location on a track boundary between adjacent tracks on a surface of a non-volatile storage medium; and
  generating a read signal for determining data bits for the adjacent tracks, wherein the read signal comprises:
    a response to a perpendicular field of each adjacent track; and
    a response to a cross-track field of each adjacent track.

* * * * *